United States Patent [19]

Fryberger et al.

[11] Patent Number: 5,041,929
[45] Date of Patent: Aug. 20, 1991

[54] AUTOLOADER FOR MAGNETIC TAPE CARTRIDGES

[75] Inventors: Joseph A. Fryberger, Longmont; Robert E. Leonard, Denver; Lynn C. Jacobs, Louisville, all of Colo.

[73] Assignee: Storage Technology Corporation, Louisville, Colo.

[21] Appl. No.: 415,182

[22] Filed: Sep. 29, 1989

[51] Int. Cl.⁵ ...................... G11B 15/68; G11B 17/22
[52] U.S. Cl. ......................................... 360/92; 369/38
[58] Field of Search ....................... 360/92; 369/34–37

[56] References Cited

U.S. PATENT DOCUMENTS

| | | | |
|---|---|---|---|
| 4,133,013 | 1/1979 | Fisher | 360/92 |
| 4,504,936 | 3/1985 | Faber et al. | 369/36 |
| 4,644,425 | 2/1987 | Tamaki | 360/71 |
| 4,697,215 | 9/1987 | Hata | 360/95 |
| 4,701,899 | 10/1987 | d'Alayer de Costomor d'Arc | 369/36 |
| 4,739,491 | 4/1988 | Baldock | 360/92 |
| 4,920,432 | 4/1990 | Eggers et al. | 360/92 |

Primary Examiner—A. J. Heinz
Assistant Examiner—Jefferson Evans
Attorney, Agent, or Firm—Dorr, Carson, Sloan & Peterson

[57] ABSTRACT

The autoloader for magnetic tape cartridges uses a companion autoloader magazine that holds a plurality of preloaded magnetic tape cartridges to individually access any one of the plurality of magnetic tape cartridges held by the magazine. The autoloader of the present invention is able to move an associated magazine containing a plurality of preloaded magnetic tape cartridges in a vertical direction, either up or down, such that the autoloader is able to selectively access any one of the plurality of magnetic tape cartridges loaded in the magazine. The autoloader contains only two motors: one for controlling the vertical motion of the magazine, one for loading a magnetic tape cartridge from the magazine into the associated tape drive. The width of the autoloader is equal to or less than the width of the associated tape drive so that two autoloader-tape drive units can be mounted side by side.

24 Claims, 7 Drawing Sheets

AUTOLOADER FOR MAGNETIC TAPE CARTRIDGES

FIELD OF THE INVENTION

This invention relates to tape drives that handle 3480 type magnetic tape cartridges and, in particular, to an autoloader apparatus that mechanically loads and unloads the 3480 type magnetic tape cartridges into and out of the associated tape drive from a magazine that holds a plurality of cartridges.

PROBLEM

It is a problem in the field of 3480 type magnetic tape drives to efficiently load and unload the 3480 type magnetic tape cartridges into the associated tape drive using an automated loader. Previous methods and devices for loading the 3480 type magnetic tape cartridges into the tape drive generally involved three methods: using a library system equipped with a magnetic tape cartridge handling robot; manually loading the magnetic tape cartridges directly into the tape drive; or using a prior art magnetic tape cartridge autoloader.

An advantage of the robot library method is its ability to store a large number of magnetic tape cartridges and its ability to select any one of the magnetic tape cartridges in the library regardless of the order in which the cartridges are stacked. However, the use of such a magnetic tape cartridge robot library system (such as the Storage Technology Corporation 4400 Automated Cartridge System) is expensive and is therefore limited by its size and cost to large computer sites.

The method of manually loading individual 3480 type magnetic tape cartridges into an associated tape drive is expensive due to the extensive labor costs and the increased probability of damage to the magnetic tape cartridge through mishandling by the operator. In addition, this method is susceptible to errors, in that the operator may load the wrong magnetic tape cartridge into the associated drive. Furthermore, the transfer of data between the tape drive and the magnetic tape cartridges is slowed if the operator does not promptly change the magnetic tape cartridge upon the completion of a read or write operation.

There are presently available a number of mechanical autoloader devices that automatically load and unload a plurality of 3480 type magnetic tape cartridges into and out of the associated tape drive. One such apparatus utilizes a tractor drive system that sequentially feeds magnetic tape cartridges into the associated tape drive one at a time. This device is relatively large and cumbersome, approximately 16½ inches high and uses four motors to operate the system. The operator must individually load the magnetic tape cartridges one at a time into an associated slot in the tractor drive. The magnetic tape cartridges are moved in a downward direction only to the unloading position. There the magnetic tape cartridge is engaged by friction feed drive which drags the magnetic tape cartridge into position over the drive hub of the associated tape drive. The magnetic tape cartridge is then unloaded in the reverse fashion and dropped into a used cartridge tray. This autoloader is large in size and mechanically complex. In addition this autoloader is only able to move cartridges in one direction and is therefore unable to selectively access a particular cartridge from the stack of cartridges.

Another autoloader device is disclosed in U.S. patent application Ser. No. 159,689 filed Feb. 24, 1988 and entitled "Automatic Magnetic Tape Cartridge Stack Loader for Tape Drive Systems". This stack loader uses an input bin to hold and plurality of magnetic tape cartridges that can be loaded all at once by an operator. Again, this autoloader only moves the tape cartridges in a downward direction to the unloading position. The magnetic tape cartridges are sequentially fed from the input bin by a friction feed drive into position over the drive hub of the associated tape drive. The magnetic tape cartridge is unloaded in the reverse fashion and dropped into a tray that contains the used magnetic tape cartridges. This type of autoloader is again only able to move the cartridges in one direction and is therefore unable to selectively access a particular cartridge from the stack of cartridges.

Therefore, there presently exists no inexpensive magnetic tape cartridge loading system that minimizes operator labor costs and yet permits selective access to individual ones of a plurality of stacked magnetic tape cartridges.

SOLUTION

The above described problems are solved and a technical advance achieved in the field by the autoloader for magnetic tape cartridges of the present invention which uses a companion autoloader magazine that holds a plurality of preloaded magnetic tape cartridges to individually access any one of the plurality of magnetic tape cartridges held by the magazine. The autoloader of the present invention is able to move an associated magazine containing a plurality of preloaded magnetic tape cartridges in a vertical direction, either up or down, such that the autoloader is able to selectively access any one of the plurality of magnetic tape cartridges loaded in the magazine. The autoloader contains only two motors: one for controlling the vertical motion of the magazine, one for loading a magnetic tape cartridge from the magazine into the associated tape drive. The width of the autoloader is equal to or less than the width of the associated tape drive so that two autoloader-tape drive units can be mounted side by side.

The autoloader also includes apparatus to initiate the engagement of the magazine with the magazine positioning apparatus to thereby precisely control the insertion of the magazine into the magazine positioning mechanism without relying on the operator to correctly perform this operation. This engagement mechanism also includes a clutch that disengages the magazine positioning apparatus when power is removed from the autoloader to enable the operator to remove the magazine from the autoloader without having to disable the magazine positioning apparatus. Furthermore, the autoloader includes a magnetically coupled drive that uses a single motor to operate both the magnetic tape cartridge shuttle and elevator apparatus that loads the selected magnetic tape cartridge into the associated tape drive. The shuttle mechanism operates without the use of a friction drive and instead uses a positioning arm for positive magnetic tape cartridge handling. The magnetic coupling apparatus releases the positioning arm when the magnetic tape cartridge is loaded into the tape elevator to lower the loaded magnetic tape cartridge onto the drive hub of the tape drive. These above described mechanisms provide precise positive engagement of the magnetic tape cartridges to prevent misalignment of the magnetic tape cartridges.

DETAILED DESCRIPTION OF THE INVENTION

The autoloader for magnetic tape cartridges uses a companion autoloader magazine that holds a plurality of preloaded magnetic tape cartridges to individually access any one of the plurality of magnetic tape cartridges held by the magazine. The autoloader of the present invention is able to move an associated magazine containing a plurality of preloaded magnetic tape cartridges in a vertical direction, either up or down, such that the autoloader is able to selectively access any one of the plurality of magnetic tape cartridges loaded in the magazine. The autoloader contains only two motors: one for controlling the vertical motion of the magazine, one for loading a magnetic tape cartridge from the magazine into the associated tape drive. The width of the autoloader is equal to or less than the width of the associated tape drive so that two autoloader-tape drive units can be mounted side by side. The autoloader also includes apparatus to initiate the engagement of the magazine with the magazine positioning apparatus to thereby precisely control the insertion of the magazine into the magazine positioning mechanism without relying on the operator to correctly perform this operation. This engagement mechanism also includes a clutch that disengages the magazine positioning apparatus when power is removed from the autoloader to enable the operator to remove the magazine from the autoloader without having to disable the magazine positioning apparatus. Furthermore, the autoloader includes a magnetically coupled drive that uses a single motor to operate both the magnetic tape cartridge shuttle and elevator apparatus that loads the selected magnetic tape cartridge into the associated tape drive. The shuttle mechanism operates without the use of a friction drive and instead uses a positioning arm in conjunction with a lead screw for positive magnetic tape cartridge handling. The magnetic coupling apparatus releases the positioning arm when the magnetic tape cartridge is loaded into the tape elevator to lower the loaded magnetic tape cartridge onto the drive hub of the tape drive. These above described mechanisms provide precise positive engagement of the magnetic tape cartridges to prevent misalignment of the magnetic tape cartridges.

Autoloader Architecture

Figure 1:
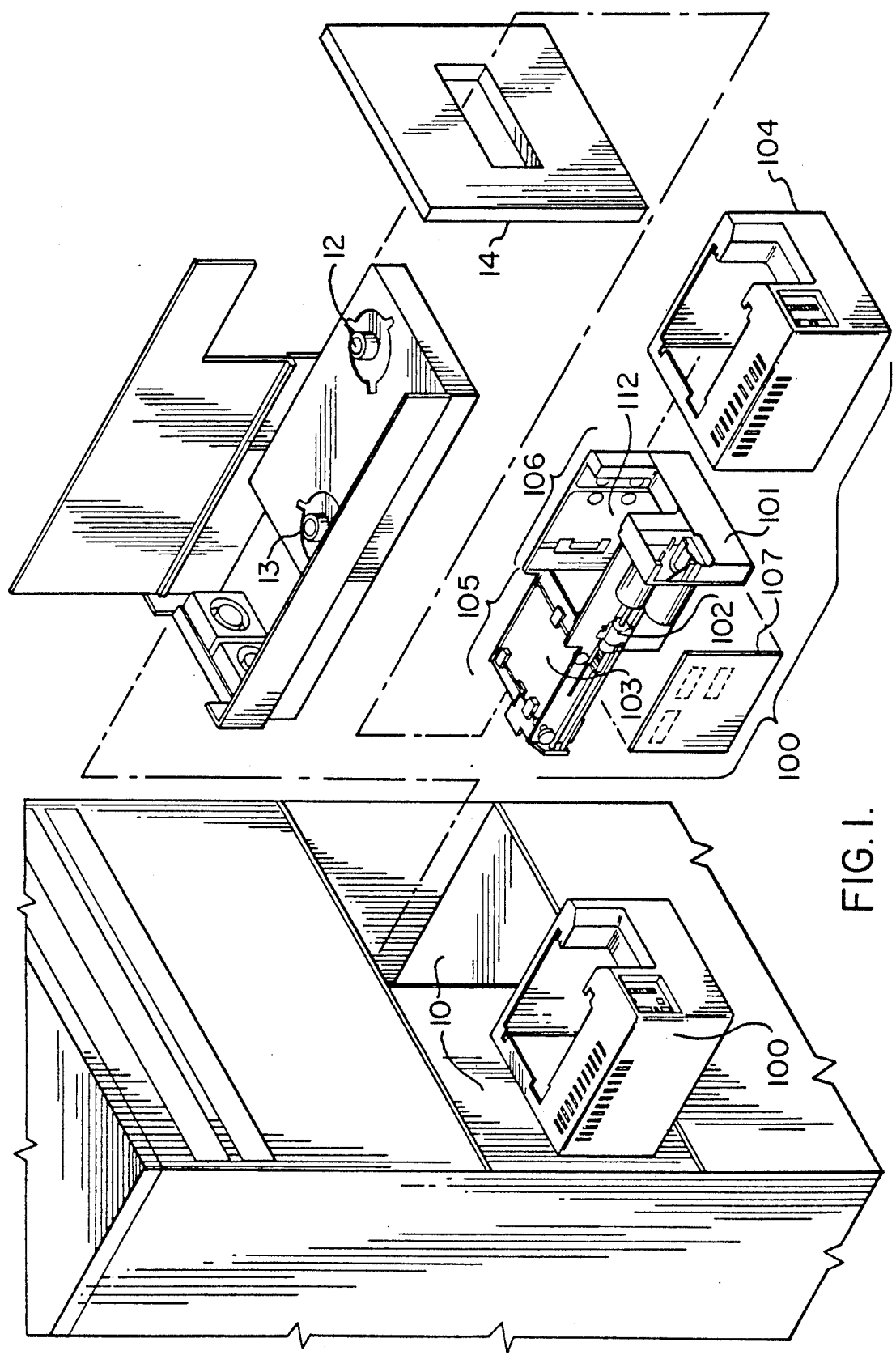
FIG. 1 is an exploded view of the autoloader of the present invention.
Figure 2:
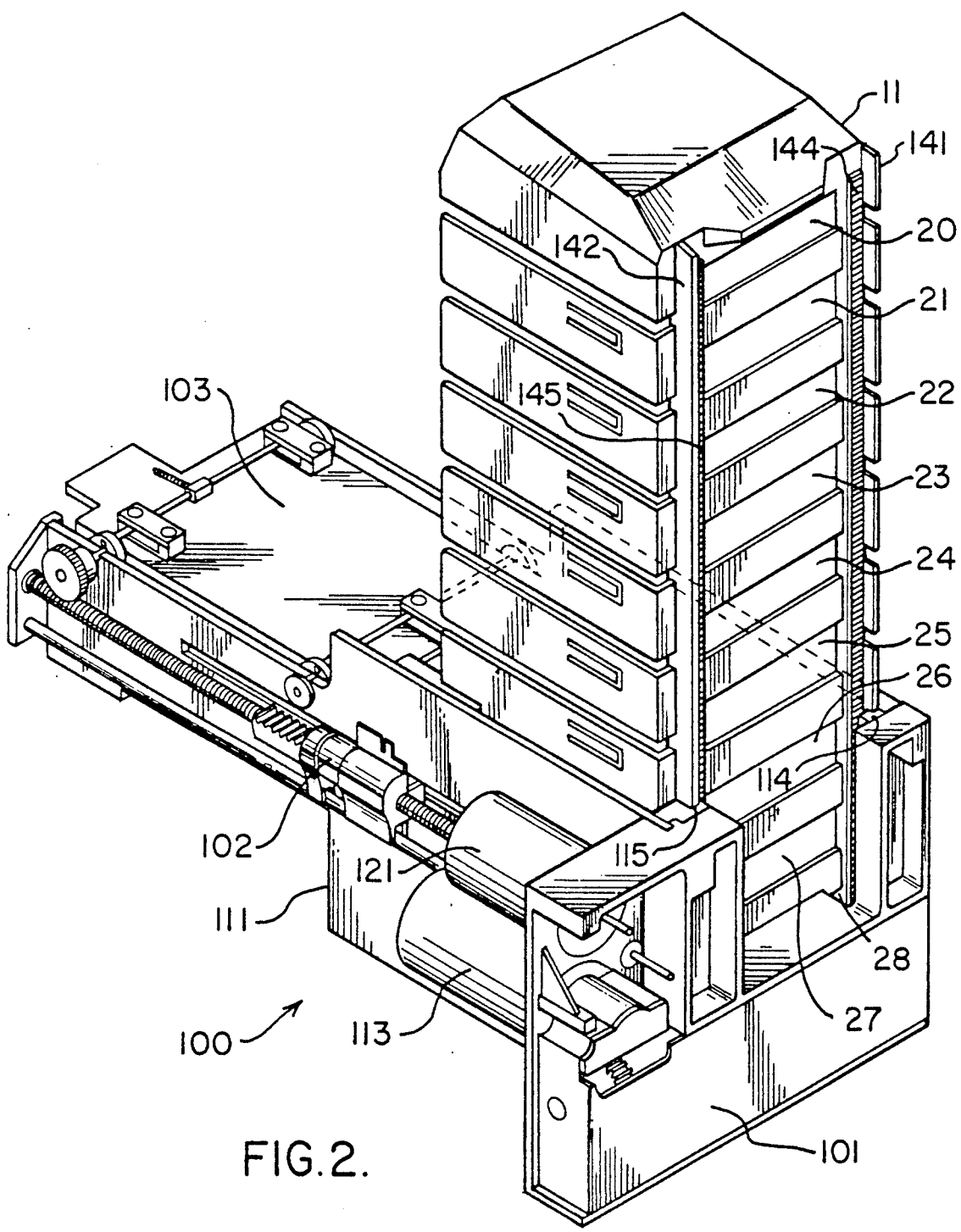
FIG. 2 is a front perspective view of the autoloader with a magnetic tape cartridge magazine inserted therein.

FIG. 2 illustrates a front perspective view of the autoloader for magnetic tape cartridges, while FIG. 1 illustrates an exploded view. As illustrated in FIG. 2, autoloader 100 is mounted on the front of an associated tape drive 10 and functions to load and unload 3480 type magnetic tape cartridges therefrom. Autoloader 100 operates in conjunction with a magazine 11 that is equipped to hold a plurality of magnetic tape cartridges 20-29. Magazine 11 illustrated in FIG. 2 contains ten 3480 type magnetic tape cartridges for illustration purposes only. The exact number of magnetic tape cartridges is a function of the particular magazine that is used. The associated tape drive 10 is a commercially available magnetic tape drive that is equipped to read and write data from 3480 type magnetic tape cartridges. Tape drive 10 contains the associated well known read and write circuitry (not shown) that is used for this purpose. The magnetic tape cartridge is typically loaded into the front of tape drive 10 and placed onto a drive hub 12 that functions with a take up reel 13 in well known fashion to transport the magnetic tape that is stored on the magnetic tape cartridge across the associated read/write heads of tape drive 10. This magnetic tape drive apparatus 10 is commercially available and well known to the art and is not disclosed herein for the purpose of simplicity.

Tape drive 10 is a unit that is typically 9 inches or less in width and can be mounted in a rack or premounted in a cabinet. Autoloader 100 is designed such that the width of autoloader 100 is equal to or less than the width of tape drive 10 in order that two autoloader equipped tape drive units can be placed side by side in a rack mount environment as shown in FIG. 1. In order to achieve this particular width requirement, autoloader 100 is a vertically loaded compact unit that mounts directly on the front of tape drive 10 without requiring modification thereof. Autoloader 100 contains a front portion 106 and a rear portion 105. The rear portion 105 fits through the opening in face plate 14 of tape drive 10 and is positioned above the drive hub 12 for loading a magnetic tape cartridge on to drive hub 12. The front portion 106 is located exterior to tape drive 10 and is enclosed by cover 104.

The use of a magazine 11 with autoloader 100 enables autoloader 100 to access magnetic tape cartridges 20-29 loaded in magazine 11 in a selective fashion. That is, autoloader 100 can access the magnetic tape cartridges 20-29 in any particular sequence no matter how they are loaded in magazine 11. This is due to the fact that autoloader 100 is a bidirectionally operating apparatus that can move magazine 11 in a vertical direction either up or down to specifically access any selected one of magnetic tape cartridges 20-29 loaded in magazine 11. In addition, autoloader 100 is designed such that an individual magnetic tape cartridge can be loaded therein without the use of magazine 11.

In order to accomplish the above described features, autoloader 100 consists of three primary mechanical sub-assemblies: magazine positioner 101, shuttle 102, and elevator 103. These three primary sub-assemblies are driven by two motors 113, 121. Motor 113 functions to operate magazine positioner 101 while motor 121 operates both shuttle 102 and elevator 103. In this fashion, motor 113 controls the vertical movement of the magazine 11 and its associated magnetic tape cartridges 20-29 while motor 121 is responsible for the horizontal movement of a selected magnetic tape cartridge that is to be transported between magazine 11 and drive hub 12 of the associated tape drive 10. A printed circuit board that contains the autoloader control circuit 107 is located on one side of autoloader 100, juxtaposed to motors 113, 121.

Magnetic Tape Cartridge Magazine/Magazine Positioner

Figure 5:
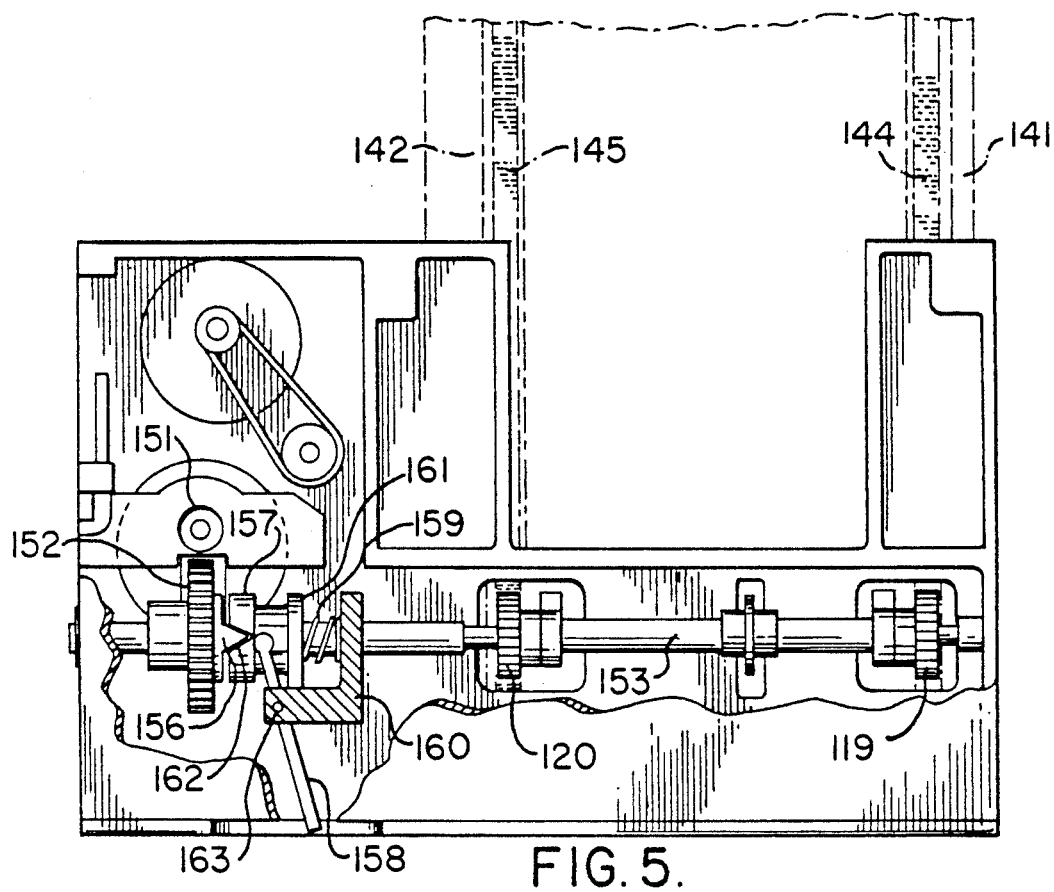
FIGS. 5-7 are detailed views of the magnetic tape cartridge magazine positioning apparatus.
Figure 6:
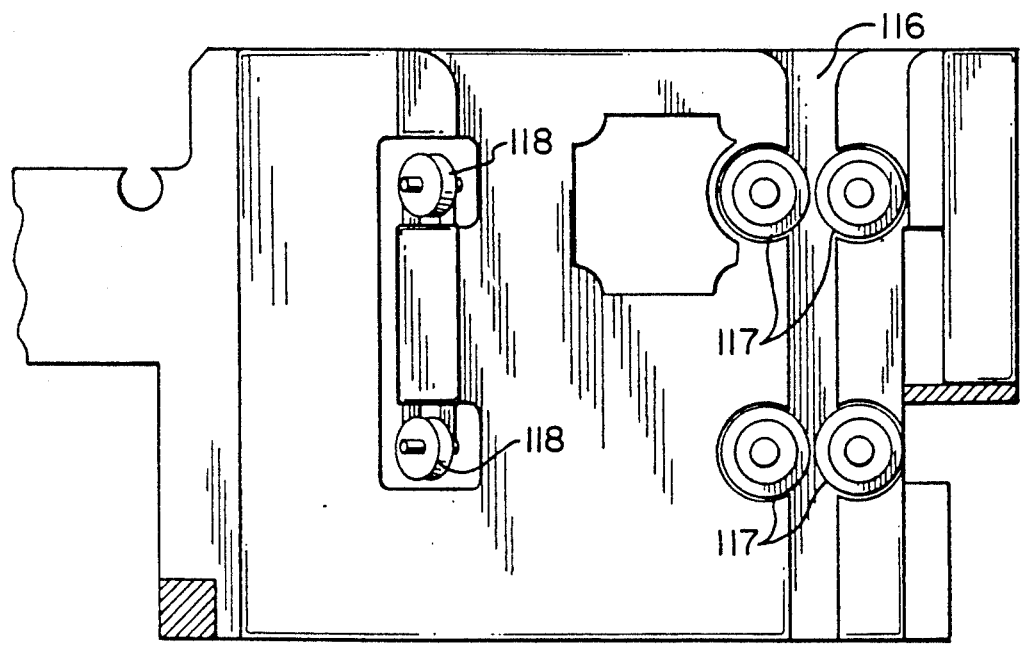
Figure 7:
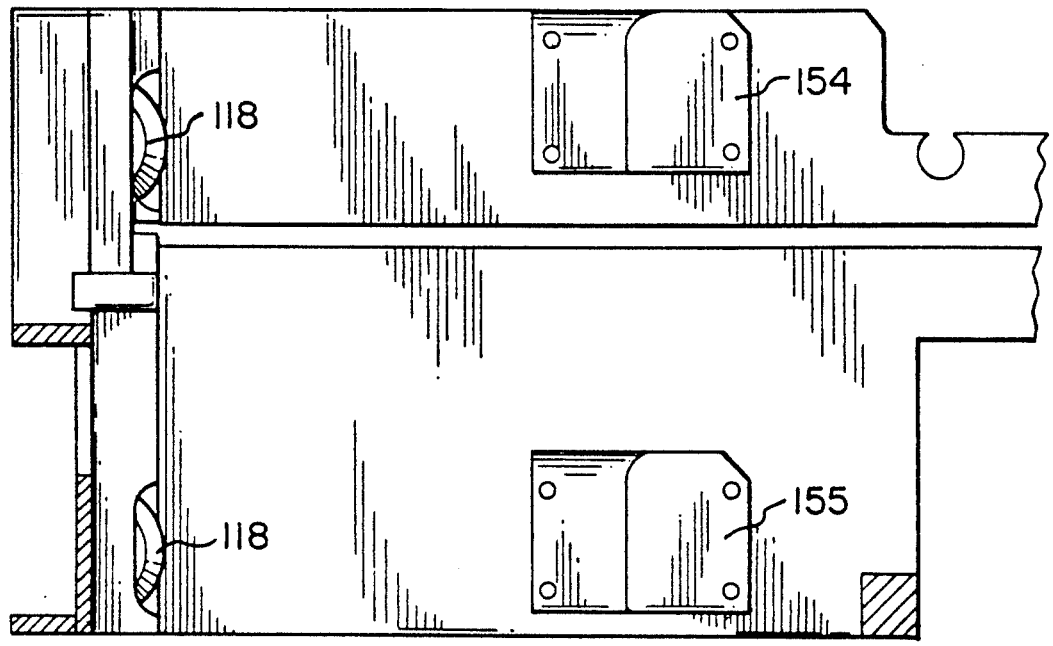

Magazine positioner 101 consists of a frame 111 that is shaped so as to form an opening 112 into which magazine 11 is inserted. Magazine 11 includes a plurality of guides shown in FIGS. 5-7 that are used to properly position and align magazine 11 inside of opening 112 so that the magnetic tape cartridge shuttle 102 can accurately and properly retrieve a selected magnetic tape cartridge from magazine 11. Included in this plurality of guides are a pair of ribs 141, 142 located on both of the front corners of magazine 11 that fit into corresponding and mating front guides 114, 115 respectively. In addition, a rib 143 is located on one side of magazine 11 which rib 143 fits into corresponding slot 116 on the corresponding side of opening 112 in frame 111. Slot 116 is equipped with slot rollers 117 to provide rolling contact between rib 113 of magazine 11 and autoloader 100 rather than a friction sliding fit. In addition, angle rollers 118 are positioned on a 45 degree angle in both of the back corners of opening 112 to correspond to the back corners, right and left, of magazine 11 to thereby maintain proper right and left alignment of magazine 11 in opening 112 as well as proper front to back positioning of magazine 11 in opening 112.

Magazine 11 is equipped with a pair of racks 144, 145 located on the frontside thereof which mate with pinion gears 119, 120 located in the front of opening 112. Pinion gears 119, 120 operate with the corresponding rack 144, 145 in rack and pinion fashion to perform a vertical translation of magazine 11 in autoloader 100. Motor 113 provides the motive force for the operation of gears 119, 120. The output of motor 113 is a worm gear 151 that operates a corresponding drive gear 152 to turn the shaft 153 that supports drive gears 119, 120. A set of electronic control circuitry (not shown) is also provided to regulate the operation of motor 113 and thereby control the vertical positioning of magazine 11. A plurality of sensors 154, 155 are also provided to identify the vertical position of magazine 11 with respect to shuttle 102 of autoloader 100 and to determine whether a magnetic tape cartridge is present in a particular position in magazine 11.

A further feature of magazine positioner 101 is a clutch mechanism 156-162 that enables a user to disengage shaft 153 and gears 119, 120 from motor 113. The clutch mechanism 156-162 includes a tooth 156 on driving gear 152 that mates with a corresponding notch 162 on driver gear 157. The driving 152 and driven 157 gears are held together in proximate relationship by the action of spring 159, wound coaxially on shaft 153 and supported at one end by bracket 160. Driven gear 157 is decoupled from driving gear 152 by the operation of lever 158 which is pivotally (163) connected to bracket 160. Lever 158 engages lip 161 of driven gear 157 as lever 158 rotates around pivot 163, and compresses spring 159. When tooth 156 and notch 162 are disengaged, shaft 153 is free to rotate and magazine 11 can be manually moved in a vertical direction to remove it from autoloader 100. This feature is particularly significant when power is removed from autoloader 100. Without clutch mechanism 156-162, motor 113 and its associated drive gears 151, 152 would prevent shaft 153 from rotating, thereby locking magazine 11 in autoloader 100.

Shuttle Mechanism

Shuttle 102 provides a positive mechanical engagement with the magnetic tape cartridge (ex. 29) that is positioned by magazine positioner 101. This is accomplished by the use of a positioning arm 123. Positioning arm 123 is C-shaped arm that positively engages the front and back of the magnetic tape cartridge to provide the translation of the magnetic tape cartridge from magazine 11 to elevator 103 of autoloader 100. Use of positioning arm 123 eliminates the need for a friction drive positioning apparatus as is used in prior art autoloaders. The use of a positive mechanical coupling such as positioning arm 123 reduces the possibility of the magnetic tape cartridge being mispositioned in elevator 103 or magazine 11. Furthermore, the use of positioning arm 123 simplifies the design of the magnetic tape cartridge position sensor that determines whether the magnetic tape cartridge is properly positioned for loading into elevator 103. Motor 121 is used to power both shuttle 102 and elevator 103. This is accomplished by motor 121 driving lead screw 122 which is connected to positioning arm 123 by way of a first segment 124 of magnetic coupling 124, 125.

Magnetic coupling 124, 125 includes a second segment 125 that contains a hole in the center, which hole is threaded to be in mating relationship with lead screw 122. Second segment 125 also includes runners 128 that ride on track 129 to prevent second segment 125 from rotating as lead screw 122 rotates. Therefore, runners 128 and track 129 maintain second segment 125 in a fixed position with respect to rotation around lead screw 122. As lead screw 122 rotates, second segment 125 translates along the length of lead screw 122 in a direction that is a function of the direction of rotation of lead screw 122.

First segment 124 of magnetic coupling 124, 125 is similar to second segment 125 in that it rides in coaxial fashion on lead screw 122 and is equipped with runners 130 that ride on track 129, to prevent rotation around lead screw 122. However, first segment 124 does not contain any threads in the hole through which lead screw 122 is placed. First segment 124 is free to slide along the length of lead screw 122 independent of the rotation or lack thereof of lead screw 122.

In operation, first segment 125 and second segment 125 include a magnet (not shown) at their common interfacing sides. The magnet maintains first 124 and second 125 segments in juxtaposed relationship (as shown on FIGS. 3, 4, 8) by magnetic force. As lead screw 122 rotates, second segment 125 is laterally translated from magazine positioner 101 toward elevator 103, carrying a magnetic tape cartridge in positioning arm 123. The magnetic force is sufficient to maintain first 124 and second 125 segments together. The second segment 125 of magnetic coupling 124, 125 continues its motion along lead screw 122 until positioning arm 123 properly seats the magnetic tape cartridge into elevator 123. At this point, a stop 127 blocks the further motion of first segment 124 of the magnetic coupling 124, 125. The continued revolutions of lead screw 122 cause the second segment 125 of the magnetic coupling 124, 125 to continue its lateral motion away from magazine positioner 101 thereby overcoming the magnetic force that joins first 124 and second 125 segments, separating first segment 124 from second segment 125. Second segment 125 also contains a plurality of drive teeth 126 located along its top side. Drive teeth 126 are positioned such that the lateral motion of second segment 125 engages drive teeth 126 with elevator drive gears 131.

Elevator Mechanism

The use of a magnetic coupling 124, 125 enables motor 121 to use a single lead screw 122 to power both shuttle mechanism 102 and elevator mechanism 103. The use of magnetic coupling 124, 125 also provides a precisely controlled sequential and synchronized operation of shuttle 102 and elevator 103. The drive teeth 126 on the second segment 125 of magnetic coupling 124, 125 cause the rotation of elevator gears 131 which function to translate housing 132 in a downward direction to properly position the magnetic tape cartridge contained in elevator 103 on drive hub 12 of the associated tape drive 10.

Figure 3:
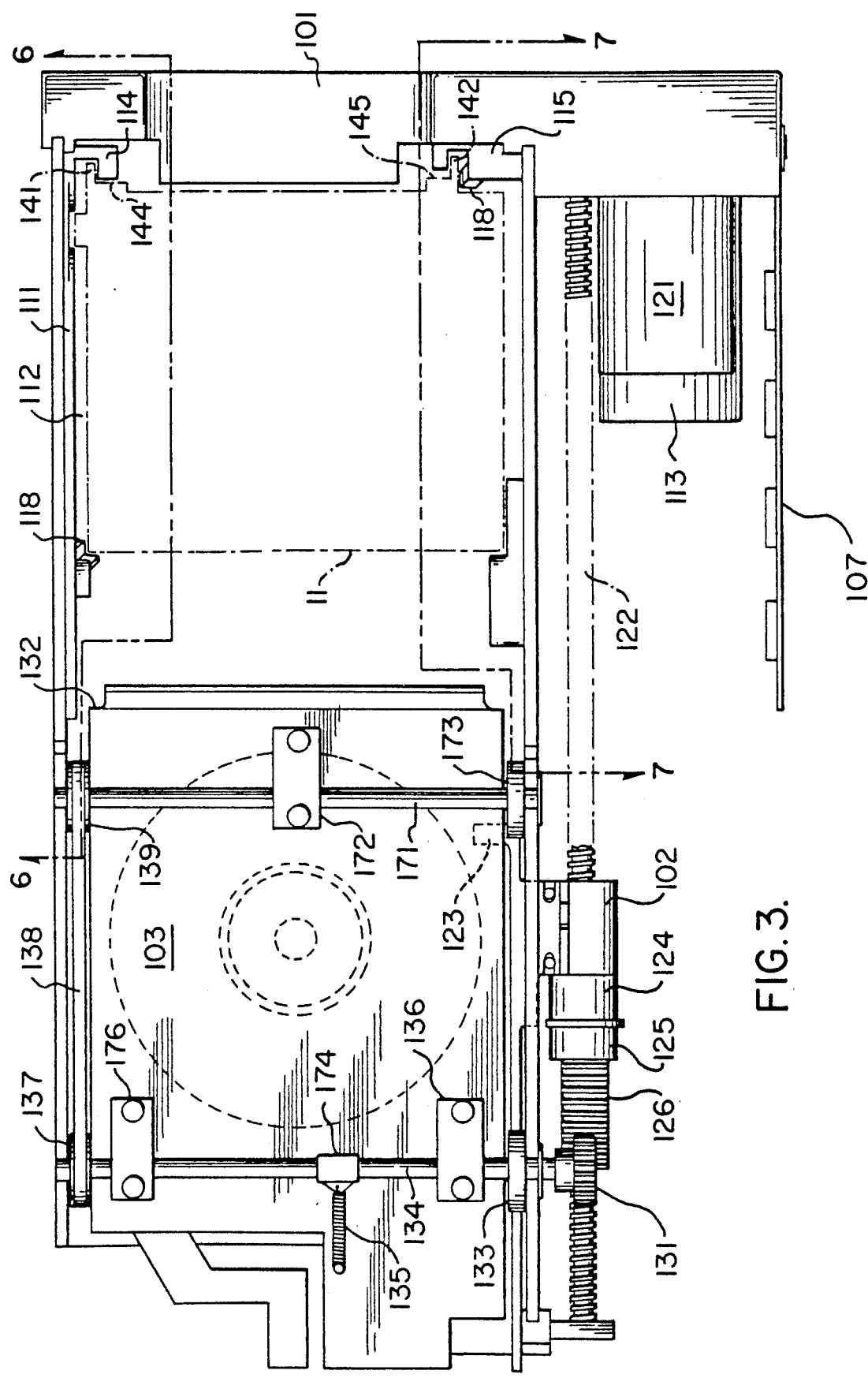
FIG. 3 is a top view of the autoloader.
Figure 4:
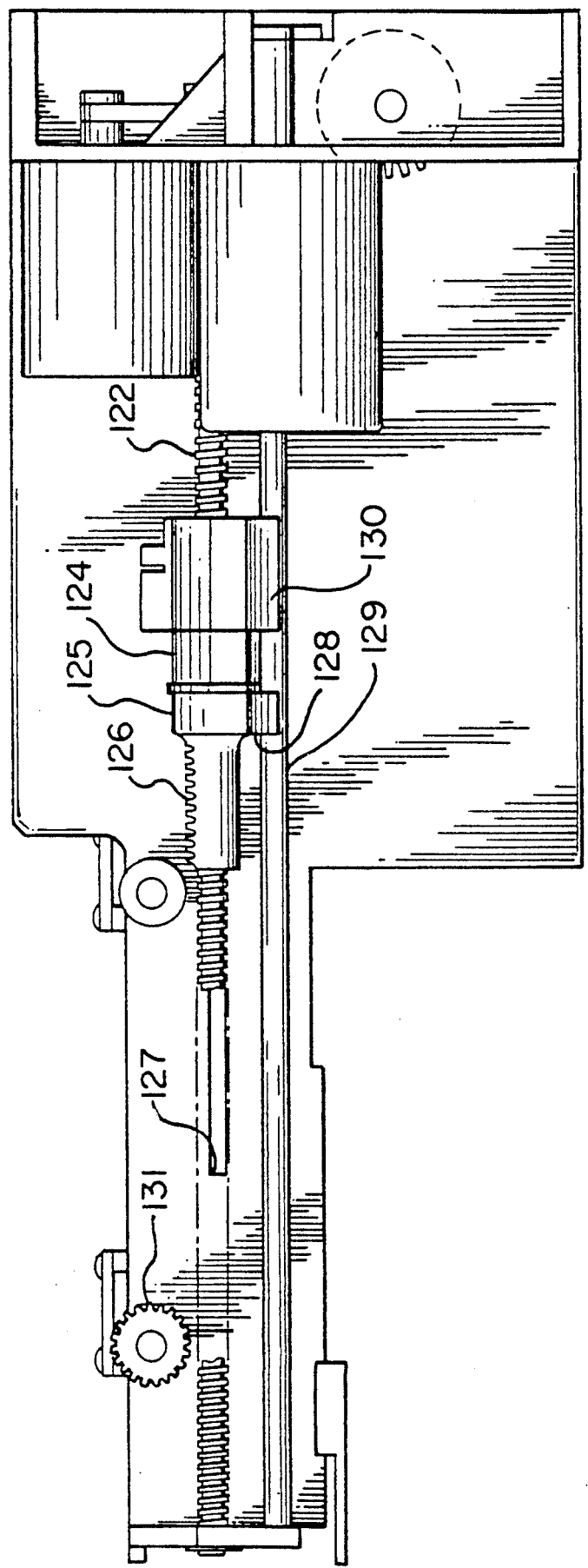
FIG. 4 is a side view of the autoloader.
Figure 8:
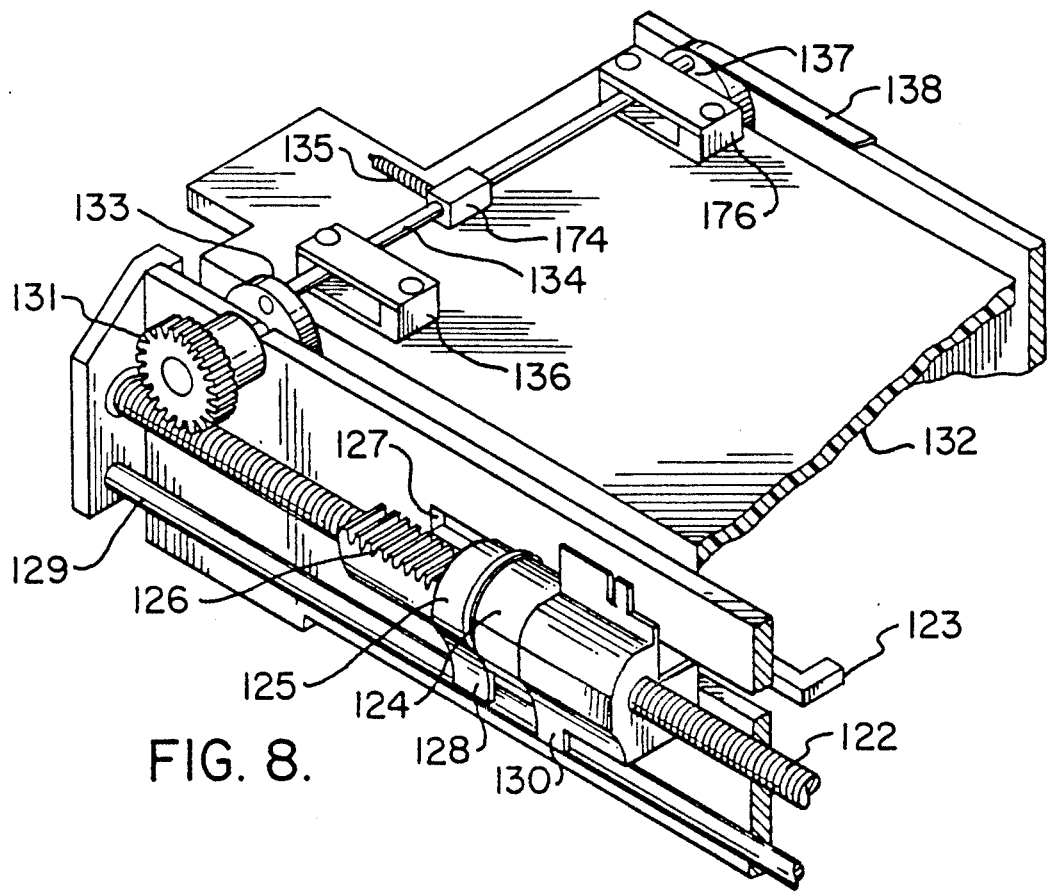
FIGS. 8-10 are detailed views of the magnetic tape cartridge shuttle and carrier apparatus.
Figure 9:
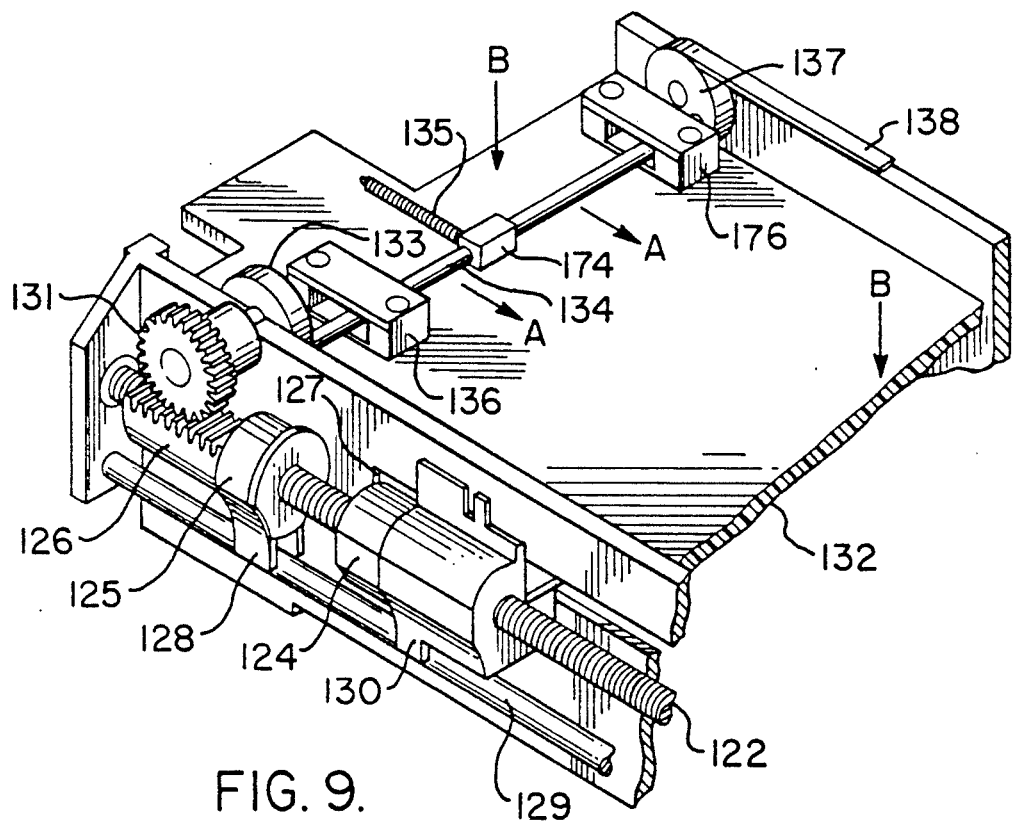
Figure 10:
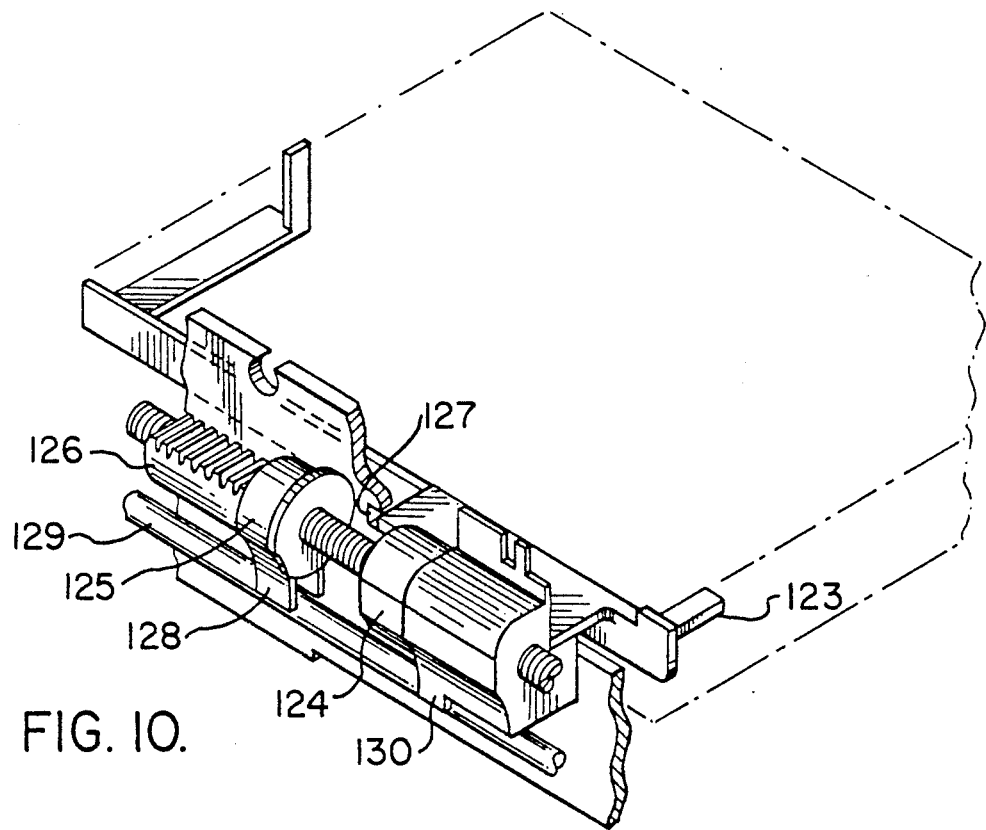

FIG. 3 provides a top view of elevator mechanism 103 while FIGS. 8-10 illustrate, in three steps, the operation of elevator mechanism 103 to load a magnetic tape cartridge on to drive hub 12. The lateral movement of second segment 125 causes drive teeth 126 to engage elevator drive gear 131 and rotate elevator drive gear 131 and its associated shaft 175 in a clockwise direction. The rotation of shaft 175 causes eccentric driver 133 to rotate in a clockwise direction as well as eccentric timing belt pulley 137 via coupling shaft 134. Eccentric timing belt pulley 137 is mechanically coupled via belt 138 to eccentric timing belt pulley 139 which in turn is coupled to eccentric driver 173 via coupling shaft 171. Thus, the rotation of elevator drive gear 131 causes the concurrent rotation of eccentric drivers and timing belt pulleys 133, 137, 139, 173 and the eccentric motion of coupling shafts 134, 171. The coupling shafts 134, 171 are mechanically linked to housing 132 via brackets 136, 176, 172, and are free to move in direction A within brackets 136, 176, 172. The eccentric rotation of coupling shafts 134, 171 causes the movement of housing 132 in a direction indicated by arrow B on FIG. 9. The sequence of FIGS. 8-10 illustrate the downward motion of housing 132 as drive gears 126 cause the rotation of elevator drive gear 131. Spring 135 is coupled to coupling shaft 134 via block 174 to firmly seat housing 132 in its fully elevated positions.

Thus, shuttle mechanism 102 and elevator mechanism 103 operate independently yet cooperatively in synchronization to laterally translate the magnetic tape cartridge from the magazine 11 to elevator mechanism 102 and to then provide the vertical positioning of the magnetic tape cartridge onto drive hub 12. Each of the sub-assemblies of autoloader 100 are bidirectional in operation.

Control Structure

The software and hardware required to control autoloader 100 are simplified by the use of the above described architecture. Autoloader control circuit 107 includes the necessary elements to effectuate the precise control of the three mechanical subassemblies 101-103 via the operation of motors 113, 121. Autoloader control circuit 107 received input data from various sensors (ex 154, 155) to determine, for example, the location and position of magazine 11 and the various magnetic tape cartridges 20-29. A significant feature of autoloader 100 is the bidirectional movement capability of magazine 11. Thus, autoloader control circuit 107 can store an ordered sequence that identifies two or more magnetic tape cartridge positions 20-29 in magazine 11. This ordered sequence is used by autoloader control circuit 107 to control magazine positioner 101 such that each magnetic tape cartridge identified in the ordered sequence is located in turn opposite the shuttle mechanism 102 for retrieval from magazine 11 and loading into the associated tape drive 10. This enables autoloader 100 to randomly access all of the magnetic tape cartridges 20-29 stored in magazine 11. The ordered sequence is typically loaded into autoloader 100 by the associated host computer.

Magazine 11 is also equipped with a plurality of slots located on the backside thereof, which slots provide visual access to the back of each magnetic tape cartridge 20-29 stored in magazine 11. Each magnetic tape cartridge 20-29 is typically provided with a label on the backside thereof which label uniquely identifies the magnetic tape cartridge. These labels typically are printed with human readable and machine readable indicia. The labels may typically contain alphanumeric machine and human readable characters, a color coding field corresponding to each of the alphanumeric characters and an adjacently located bar code. Thus, autoloader 100 can be optionally equipped with a sensor (not shown) to read the machine readable indicia imprinted on the labels that are placed on the back of each magnetic tape cartridge. Therefore, by coupling the output of the sensor with control circuit 107 in the autoloader 100, the associated central processing unit can identify each magnetic tape cartridge that is positioned for loading into tape drive 10 by autoloader 100. In this fashion, the central processing unit can either schedule the data read and write operations as a function of the next magnetic tape cartridge that is presented by autoloader 100 to the associated tape drive 10 or can use the tape cartridge identification capability of autoloader 100 to locate designated magnetic tape cartridge loaded of magnetic tape cartridges into magazine 11 either in random order or even in predefined order and the autoloader 100 in conjunction with the central processing unit can override what the operator has done to thereby correct mistakes or search for the appropriate magnetic tape cartridge in a randomly loaded collection thereof.

Summary

Magazine positioner 101 selectively translates magazine 11 up or down in the vertical direction to access any of the cartridge slots in magazine 11. Shuttle mechanism 102 retrieves a magnetic tape cartridge from magazine 11 and transports it to elevator mechanism 103 or transports the magnetic tape cartridge from elevator mechanism 103 to magazine 11. Elevator mechanism 103 loads a magnetic tape cartridge received from shuttle mechanism 102 onto drive hub 12 or removes the magnetic tape cartridge from drive hub 12 and places this retrieved magnetic tape cartridge into shuttle mechanism 102. These three interactively cooperative yet independent sub-assemblies use only two motors to operate the entire autoloader. This enables the autoloader 100 to be constructed within the constraint that the width of the autoloader 100 must be less than or equal to the width of the associated tape drive 10. The vertical positioning capability of the magazine positioner 101 enables magnetic tape cartridges to be loaded in arbitrary order in magazine 11 and retrieved as required in any ordered sequence and timing.

While a specific embodiment of this invention has been disclosed, it is expected that those skilled in the art can and will design alternate embodiments of this invention that fall within the scope of the appended claims.

I claim:

1. An autoloader connected to an associated tape drive, said tape drive having an opening through which said autoloader can access a drive hub located in said tape drive, for transferring magnetic tape cartridges between said drive hub and a magnetic tape cartridge magazine, that is disjunct from said autoloader and bidirectionally movable in a vertical direction and that holds a plurality of preloaded magnetic tape cartridges in individual positions therein, comprising:

engagement means for engaging said autoloader with a mating rack on said magnetic tape cartridge magazine, wherein said magazine is manually removable and manually insertable into said autoloader, for vertically translating said magazine tape cartridge magazine, when inserted into said autoloader, either up or down, such that a selected one of said individual positions is located opposite said opening in said associated tape drive; and means for loading a magazine tape cartridge from said selected individual position in said magnetic tape cartridge magazine on to said drive hub in said associated tape drive.

2. The apparatus of claim 1 further comprising:

means for storing an ordered sequence identifying two or more of said individual positions in any selected order.

3. The apparatus of claim 2 wherein said engagement means includes:

means for positioning said magnetic tape cartridge magazine such that each one of said individual positions identified in said sequence is located in turn opposite said loading means for access to said magnetic cartridge located therein.

4. The apparatus of claim 1 wherein said loading means includes:

means for lowering said magnetic tape cartridge from said selected individual position on to said drive hub; and means for transporting said magnetic tape cartridge from said selected individual position in said magnetic tape cartridge magazine to said lowering means.

5. The apparatus of claim 4 wherein said translating means includes:

gear train means engagable with a mating rack on said magnetic tape cartridge magazine for controllably moving said magnetic tape cartridge magazine bidirectionally in a vertical direction;

first motor means for powering said gear train means.

6. The apparatus of claim 5 wherein said loading means includes:

means for operating said lowering means and said transporting means in sequence.

7. The apparatus of claim 6 wherein said loading means further includes:

second motor means for powering said operating means.

8. The apparatus of claim 1, wherein said magnetic tape cartridge magazine contains an aperture therein for each of said individual positions such that indicia imprinted on the magnetic tape cartridge contained in each of said individual positions can be viewed, further including:

means for automatically reading said indicia imprinted on said magnetic tape cartridges as said magnetic tape cartridge magazine is translated in said vertical direction.

9. The apparatus of claim 8 further including:

means for recording said indicia imprinted on said magnetic tape cartridge in each of said individual positions in said magnetic tape cartridge magazine.

10. An autoloader, connected to an associated tape drive which includes a drive hub, for transferring magnetic tape cartridges between a magnetic tape cartridge magazine, that is movable bidirectionally in a vertical direction and that holds a plurality of preloaded magnetic tape cartridges in individual positions therein, and said drive hub comprising:

means for loading a magnetic tape cartridge from an individual position in said magnetic tape cartridge magazine on to said drive hub;

means for storing an ordered sequence identifying two or more of said individual positions in any selected order;

engagement means for engaging said autoloader with a mating rack on said magnetic tape cartridge magazine, wherein said magazine is manually movable and manually insertable into said autoloader, for bidirectionally translating said magnetic tape cartridge magazine in a vertical direction such that each one of said individual positions identified in said ordered sequence is located in turn opposite said loading means for access to said magnetic tape located in said individual position; and means for activating said loading means to load said magnetic tape cartridge located in said individual position on to said drive hub.

11. The apparatus of claim 10 wherein said loading means includes:

means for lowering said magnetic tape cartridge from said selected individual position on to said drive hub; and means for transporting said magnetic tape cartridge from said selected individual position in said magnetic tape cartridge magazine to said lowering means.

12. The apparatus of claim 11 wherein said engagement means includes:

gear train means engagable with a mating rack on said magnetic tape cartridge magazine for controllably moving said magnetic tape cartridge magazine bidirectionally in a vertical direction;

first motor means for powering said gear train means.

13. The apparatus of claim 12 wherein said loading means includes:

means for sequentially and independently operating said lowering means and said transporting means.

14. The apparatus of claim 13 wherein said loading means further includes:

second motor means for powering said operating means.

15. In an autoloader connected to an associated tape drive having an opening therein through which said autoloader can access a drive hub located in said tape drive, a method of transferring magnetic tape cartridges between a magnetic tape cartridge magazine, that is movable bidirectionally in a vertical direction and that holds a plurality of preloaded magnetic tape cartridges in individual positions therein and said drive hub, comprising the steps of:

storing data representative of an ordered sequence of two or more of said individual positions;

bidirectionally positioning said magnetic tape cartridge magazine, in a vertical direction, either up or down, via a gear train in said autoloader which engages a mating rack on said magnetic tape cartridge magazine, wherein said magazine is manually removable and manually insertable into said autoloader, such that each one of said individual positions identified in said ordered sequence is located in turn opposite said opening in said associated tape drive; and loading said magnetic tape cartridge from said individual position in said magnetic tape cartridge magazine on to said drive hub.

16. The method of claim 15 wherein said step of loading includes the steps of:

transporting said magnetic tape cartridge from said selected individual position in said magnetic tape cartridge magazine to a location over said drive hub; and lowering said selected magnetic tape cartridge on to said drive hub.

17. An autoloader for transferring magnetic tape cartridge between a magnetic tape cartridge magazine, that is bidirectionally movable in a vertical direction and that holds a plurality of preloaded magnetic tape cartridges in individual positions therein, and an associated tape drive having a front side of width w with an opening therein through which said autoloader can access a drive hub contained in said tape drive, comprising:

engagement means for engaging said autoloader with a mating rack on said magnetic tape cartridge magazine, wherein said magazine is manually removable and manually insertable into said autoloader, having a width no greater than w and attached to said front side of said associated tape drive, for bidirectionally vertically translating said magnetic tape cartridge magazine, such that a selected one of said individual positions is located opposite said opening in said associated tape drive; and means, located between said translating means and said drive hub of said associated tape drive and of width no greater than w, for loading a magnetic tape cartridge from said selected individual position in said magnetic tape cartridge magazine on to said drive hub in said associated tape drive.

18. The apparatus of claim 17 wherein said loading means includes:

means for lowering said magnetic tape cartridge from said selected individual position on to said drive hub; and means for transporting said magnetic tape cartridge from said selected individual position in said magnetic tape cartridge magazine to said lowering means.

19. The apparatus of claim 18 wherein said engagement means includes:

gear train means engagable with a mating rack on said magnetic tape cartridge magazine for controllably moving said magnetic tape cartridge magazine bidirectionally in a vertical direction;

first motor means for powering said gear train means.

20. The apparatus of claim 19 wherein said loading means includes:

means for operating said lowering means and said transporting means in sequence.

21. The apparatus of claim 20 wherein said loading means further includes:

second motor means for powering said operating means.

22. A method of loading magnetic tape cartridges into a tape drive unit using a magazine holding a plurality of magnetic tape cartridges and an autoloader connected to said drive unit, wherein said magazine comprises a plurality of vertically-spaced cartridge receiving slots,; said autoloader comprises engagement means for engaging said autoloader with a mating rack on said magnetic tape cartridge magazine, wherein said magazine is manually removable and manually insertable into said autoloader, for vertically bidirectionally moving said magazine, means to directly engage said cartridges retained in said cartridge receiving slots and means to deliver said cartridges into said tape drive unit; said method comprising the steps of:

a. inserting said magazine containing said plurality of magnetic tape cartridges into said autoloader;

b. vertically translating said magazine to position a selected one of said magnetic tape cartridges juxtaposed to said engagement means;

c. engaging said selected magnetic tape cartridges by said autoloader engagement means;

d. delivering said selected magnetic tape cartridge from said cartridge receiving slot into said tape drive unit for use by said tape drive unit;

e. returning said selected magnetic tape cartridge from said tape drive unit after use to said cartridge receiving slot;

f. disengaging said autoloader engagement means from said selected magnetic tape cartridge;

g. repeating steps b-f until all of said magnetic tape cartridges have been used or the system job is completed.

23. A method of loading magnetic tape cartridges into a tape drive unit using a magazine holding a plurality of magazine tape cartridges and an autoloader, wherein said magazine comprises a plurality of vertically-spaced cartridge receiving slots, access slots extending horizontally across one of the side walls in each of said cartridge receiving slots; said autoloader comprises engagement means for engaging said autoloader with a mating rack on said magnetic tape cartridge magazine, wherein said magazine is manually removable and manually insertable into said autoloader, for vertically bidirectionally moving said magazine, means to directly engage said cartridges retained in said cartridge receiving slots through said access slots and means to deliver said cartridges into said tape drive unit; said method comprising the steps of:

a. inserting said magazine containing said plurality of magnetic tape cartridges into said autoloader;

b. vertically translating said magazine to position a selected one of said magnetic tape cartridges juxtaposed to said engagement means;

c. engaging said selected magnetic tape cartridge by said autoloader engagement means through said access slot;

d. delivering said selected magnetic tape cartridge from said cartridge receiving slot to said tape drive unit for use by said tape drive unit;

e. returning said selected magnetic tape cartridge from said tape drive unit after use to said cartridge receiving slot;

f. disengaging said autoloader engagement means from said selected magnetic tape cartridge;

g. repeating steps b-f until all of said magnetic tape cartridges have been used or until the system job is complete;

h. removing said magazine from said autoloader.

24. A method of loading magnetic tape cartridges into a tape drive unit using a magazine holding a plurality of magnetic tape cartridges and an autoloader connected to said tape drive unit, wherein said magazine comprises a plurality of vertically-spaced horizontal cartridge receiving slots, detents formed in each cartridge receiving slot to retain said magnetic tape cartridges in said cartridge receiving slots after insertion into said cartridge receiving slots therein, access slots extending horizontally across one of the side walls in each of said cartridge receiving slots; said autoloader comprises engagement means for engaging said autoloader with a mating rack on said magnetic tape cartridge magazine, wherein said magazine is manually removable and manually insertable into said autoloader, for vertically bidirectionally moving said magazine, means to directly engage said cartridges retained in said cartridge receiving slots through said access slots and means to deliver said cartridges into said tape drive unit; said method comprising the steps of:

a. inserting said magazine tape cartridges into said cartridge receiving slots until said magnetic tape cartridges are retained by said detents;
   b. inserting said magazine into said autoloader;
   c. vertically translating said magazine to position a selected one of said magnetic tape cartridges juxtaposed to said engagement means;
   d. engaging said selected magnetic tape cartridges by said autoloader engagement means through said access slot;
   e. delivering said selected magnetic tape cartridge to said tape drive unit for use by said tape drive unit;
   f. returning said selected magnetic tape cartridge from said tape drive unit after use to said cartridge receiving slot;
   g. disengaging said autoloader engaging means from said selected magnetic tape cartridge;
   h. repeating steps c-g until either all of said magnetic tape cartridges have been used or the system job is complete;
   i. removing said magazine from said autoloader.

* * * * *